(12) United States Patent
Pouncil

(10) Patent No.: US 9,016,614 B1
(45) Date of Patent: Apr. 28, 2015

(54) LINE REELING APPARATUS AND ASSOCIATED USE THEREOF

(71) Applicant: Emmett Pouncil, Hawthorne, CA (US)

(72) Inventor: Emmett Pouncil, Hawthorne, CA (US)

( * ) Notice: Subject to any disclaimer, the term of this patent is extended or adjusted under 35 U.S.C. 154(b) by 172 days.

(21) Appl. No.: 13/694,645

(22) Filed: Dec. 20, 2012

(51) Int. Cl.
  *B65D 85/02* (2006.01)
  *B65D 85/67* (2006.01)
  *B65H 16/00* (2006.01)
  *B65H 49/00* (2006.01)
  *B65H 75/00* (2006.01)
  *A01K 89/00* (2006.01)

(52) U.S. Cl.
  CPC ............ *A01K 89/003* (2013.01); *Y10S 242/902* (2013.01)

(58) Field of Classification Search
  CPC ..................................................... A01K 89/003
  USPC ................... 242/323, 566, 598.3, 594, 129.6, 242/129.62, 550, 588, 598.5, 902
  See application file for complete search history.

(56) References Cited

U.S. PATENT DOCUMENTS

| 2,580,130 | A | * | 12/1951 | Rowdon | 43/21.2 |
|---|---|---|---|---|---|
| 2,727,702 | A | * | 12/1955 | Latincich | 242/404.2 |
| 2,848,778 | A | * | 8/1958 | Plummer, Sr. et al. | 24/535 |
| 2,899,148 | A | * | 8/1959 | Brainard | 242/129.8 |
| 3,026,059 | A | * | 3/1962 | Dennler | 242/593 |
| 3,629,966 | A | * | 12/1971 | Sanchez | 43/25 |
| 3,679,151 | A | * | 7/1972 | Rice | 242/423.1 |
| 3,951,354 | A | * | 4/1976 | Bagby | 242/129.8 |
| 4,540,136 | A | * | 9/1985 | Rauch | 242/396.9 |
| 4,776,527 | A | * | 10/1988 | Prowant | 242/591 |
| 4,948,059 | A | * | 8/1990 | Lewitt | 242/423.2 |
| 4,948,064 | A | * | 8/1990 | Richard | 242/423.2 |
| D365,013 | S | * | 12/1995 | Fujino | D8/359 |
| 5,513,463 | A | * | 5/1996 | Drinkwater | 43/25 |
| 5,544,839 | A | | 8/1996 | Burch | |
| 5,709,350 | A | | 1/1998 | Davis | |
| 5,725,172 | A | * | 3/1998 | Koehler et al. | 242/395 |
| 5,794,883 | A | | 8/1998 | MacEwen | |
| 5,839,687 | A | * | 11/1998 | Magnafici | 242/404.3 |
| 5,918,407 | A | * | 7/1999 | Sebestyen | 43/43.11 |
| 6,609,673 | B1 | * | 8/2003 | Johnson | 242/423.1 |
| 6,742,737 | B1 | * | 6/2004 | Conner | 242/323 |
| 7,523,881 | B2 | * | 4/2009 | Hitomi et al. | 242/223 |
| 7,841,553 | B2 | * | 11/2010 | Touchstone | 242/129.8 |
| 7,845,106 | B2 | * | 12/2010 | Norman | 43/21.2 |
| 8,656,632 | B1 | * | 2/2014 | Mercier | 43/27.4 |
| 2007/0017144 | A1 | * | 1/2007 | Colon | 43/25 |
| 2007/0266615 | A1 | * | 11/2007 | Norman | 43/19.2 |
| 2008/0191080 | A1 | * | 8/2008 | Shalosky | 242/323 |
| 2010/0325935 | A1 | * | 12/2010 | Chen | 43/25 |
| 2012/0017487 | A1 | * | 1/2012 | O'Keefe | 43/21.2 |

* cited by examiner

*Primary Examiner* — Emmanuel M Marcelo
(74) *Attorney, Agent, or Firm* — Robert J. Lauson, Esq.; Lauson & Tarver LLP

(57) ABSTRACT

A fishing line reeling apparatus for loading a spool of fishing line about a reel of a fishing pole includes a clamp capable of being anchored to a ledge of an existing support surface, and a bracket attached to the clamp wherein the bracket has a dowel capable of rotatably receiving and suspending the existing spool of fishing line above the existing support surface. An arm is located subjacent to the dowel and statically mated to the bracket. The arm has an eyelet attached to a distal end thereof such the fishing line is downwardly guided from the spool and urged along a longitudinal length of the arm prior to passing through the eyelet.

10 Claims, 4 Drawing Sheets

LINE REELING APPARATUS AND ASSOCIATED USE THEREOF

CROSS REFERENCE ID RELATED APPLICATIONS

This application claims the benefit of U.S. Provisional Application No. 61/577,121 filed Dec. 19, 2011, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF NON-LIMITING EXEMPLARY EMBODIMENT(S) OF THE PRESENT DISCLOSURE

1. Technical Field

Exemplary embodiment(s) of the present disclosure relate to the sport of fishing and, more particularly, to a line reeling apparatus for providing users with an easy and convenient means of assisting the relining of a reel with a damaged line of a fishing pole.

2. Prior Art

One of the most beloved and well known sports enjoyed by Americans is fishing. In fact, the estimated number of U.S. recreational anglers is well over 50 million, with more participants than golfing and tennis combined. An enduring American tradition, fishing is enjoyed by people of all ages and from all walks of life. Recent data released by the U.S. Fish & Wildlife Service reveals that the sports fishing brings $116 billion worth of benefits to the local, state and national economies. Because sport fishing is extremely enjoyable, many participants find it suitable to fish whenever the time permits and the opportunity presents itself. Every child, boy or girl, remembers the first time their father or grandfather took them fishing.

In addition to reveling in the quality time spent in the beautiful outdoors with a respected adult, kids are very excited to try to lure an unsuspecting fish with their pole and bait. Nothing quite equates the sense of accomplishment felt by a child when he successfully catches a fish. The sudden jerks that signify a nibble on a line, the tense downward pull that ensures a hook has found its mark, and the frenzied reel-in of the line to find the prize swaying from the other end, all combine to foster feelings of glee and wonder for children who fish. With all the positive benefits of exposing youngsters to this thrilling sport, the first few attempts at teaching children the art are fishing can be a bit challenging.

Particularly, properly lining a reel onto a pole can be a bit daunting to young anglers. Trying to manipulate the thin material of the line and carefully wind it over the reel can be a frustrating endeavor, especially if the line jumps or becomes twisted and thus one must start the entire process over from the beginning. In addition, adults who experience hand ailments such as arthritis may find it painful, or even impossible, to manually reline. Often requiring the fisherman to seek assistance from a friend, relining a fishing pole can be a challenging endeavor that takes away much of the fun associated with this exciting sport.

Accordingly, a need remains for a reeling apparatus in order to overcome prior art shortcomings. The exemplary embodiment(s) satisfy such a need by providing an apparatus that is convenient and easy to use, lightweight yet durable in design, versatile in its applications, and designed for assisting the relining of a reel with a damaged line of a fishing pole.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a fishing line reeling apparatus for loading a spool of fishing line about a reel of a fishing pole. These and other objects, features, and advantages of the non-limiting exemplary embodiment(s) are provided by a fishing line reeling apparatus including a clamp capable of being anchored to a ledge of an existing support surface, and a bracket attached to the clamp wherein the bracket has a dowel capable of rotatably receiving and suspending the existing spool of fishing line above the existing support surface. An arm is located subjacent to the dowel and statically mated to the bracket. The arm has an eyelet attached to a distal end thereof such the fishing line is downwardly guided from the spool and urged along a longitudinal length of the arm prior to passing through the eyelet.

In a non-limiting exemplary embodiment, the clamp includes an upper arm and a lower arm spaced apart therefrom in such a manner that the upper and lower arms are capable of being removably attached to the ledge of the existing support surface. A plate is intermediately positioned between the upper and lower arms and a tension screw vertically passes through the lower arm and engaging the plate. A knob is positioned subjacent to the lower arm and statically attached to the tension screw. In this manner, synchronous rotation of the knob and the tension screw in a first rotational direction urges a portion of the plate upwardly and away from the lower arm. Conversely, synchronous rotation of the knob and the tension screw in a second rotational direction releases the portion of the plate downwardly and towards the lower arm.

In a non-limiting exemplary embodiment, the bracket includes first and second vertically oriented planar side walls, and a horizontally oriented planar base support member intermediately coupled to the first and second vertically oriented planar side walls.

In a non-limiting exemplary embodiment, the dowel is removably anchored to the first and second vertically oriented planar side walls and spans across an entire width of the planar base support member.

In a non-limiting exemplary embodiment, the bracket further includes first and second vertically oriented rectilinear support arms removably coupled to the first and second vertically oriented planar side walls. Notably, the dowel is removably anchored to the first and second vertically oriented support arms and spaced above the first and second vertically oriented side walls. In this manner, the dowel spans across an entire width of the planar base support member.

The present disclosure further includes a method of utilizing a fishing line reeling apparatus for loading a spool of fishing line about a reel of a fishing pole. Such a method includes the steps of providing and anchoring a clamp to a ledge of an existing support surface; providing and attaching a bracket to the clamp, the bracket having a dowel rotatably receiving and suspending the existing spool of fishing line above the existing support surface; providing and statically mating a dowel to the bracket by locating the arm subjacent to the dowel, the arm having an eyelet attached to a distal end thereof; and downwardly guiding a fishing line from the spool and urging the fishing line along a longitudinal length of the arm prior to passing the fishing line through the eyelet.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
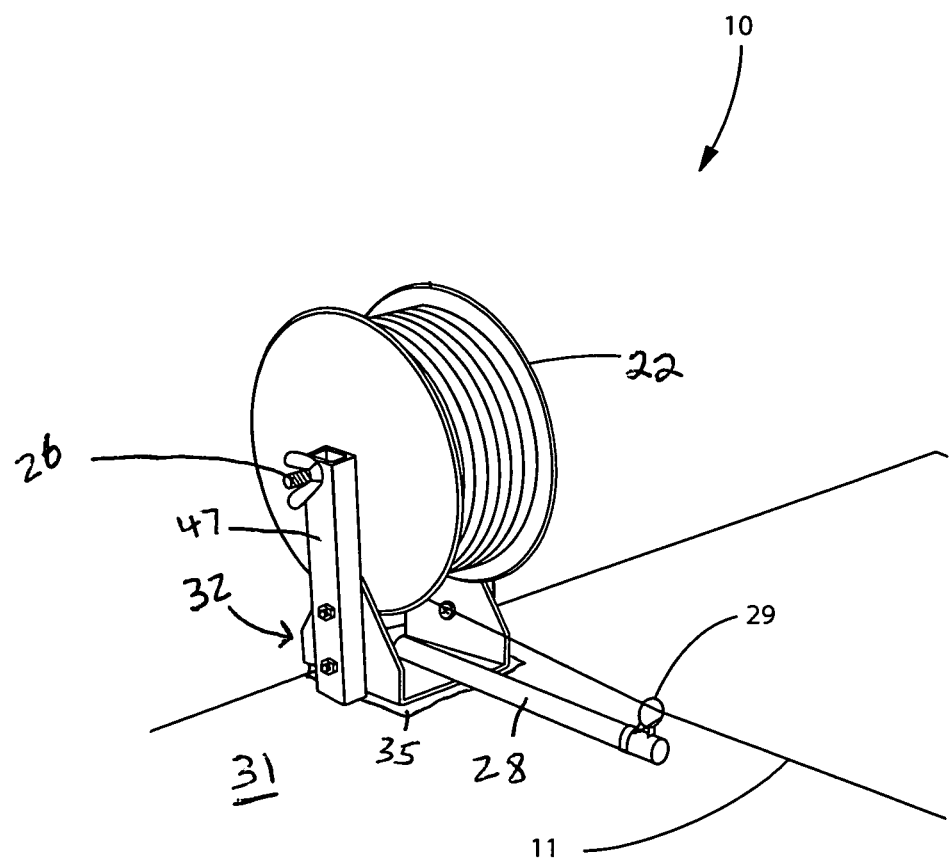
FIG. 1 is a perspective view showing a fishing line reeling apparatus clamped to a support surface and having a spooling of fishing line rotatably suspended above the support surface, in accordance with a non-limiting exemplary embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

A non-limiting exemplary embodiment of the present disclosure is referred to generally in figures and is intended to provide a reeling apparatus. It should be understood that the exemplary embodiment may be used to assist the relining of a reel with a damaged line of a fishing pole and many different types of cable or wire reels, and should not be limited to any particular uses described herein.

Figure 2A:
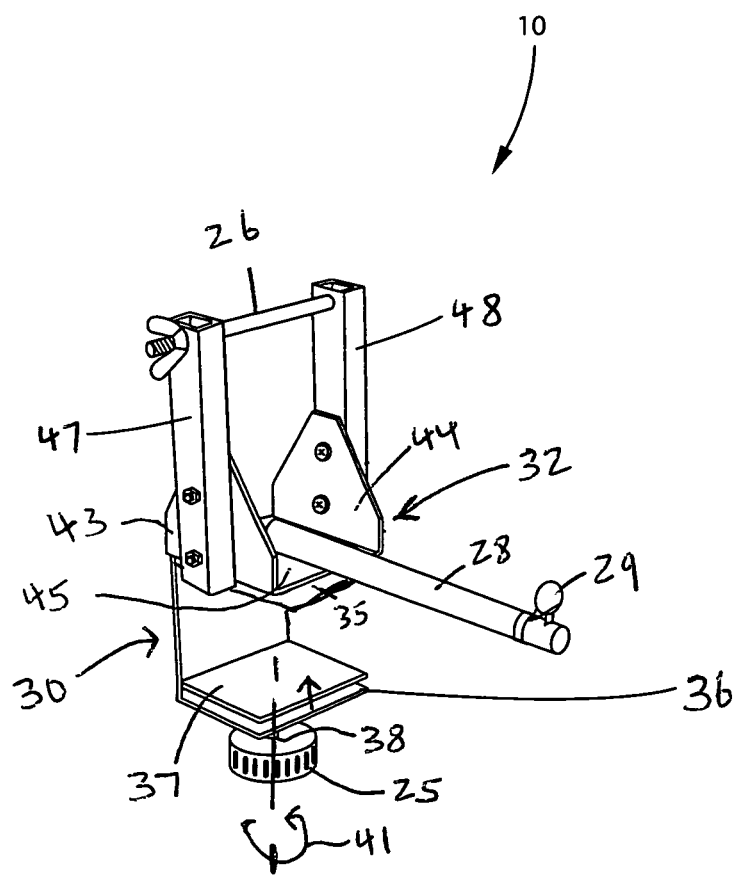
FIG. 2A is a perspective view showing a fishing line reeling apparatus wherein the knob and screw are rotated in a first rotational direction for tightened the clamp, in accordance with a non-limiting exemplary embodiment of the present disclosure.
Figure 2B:
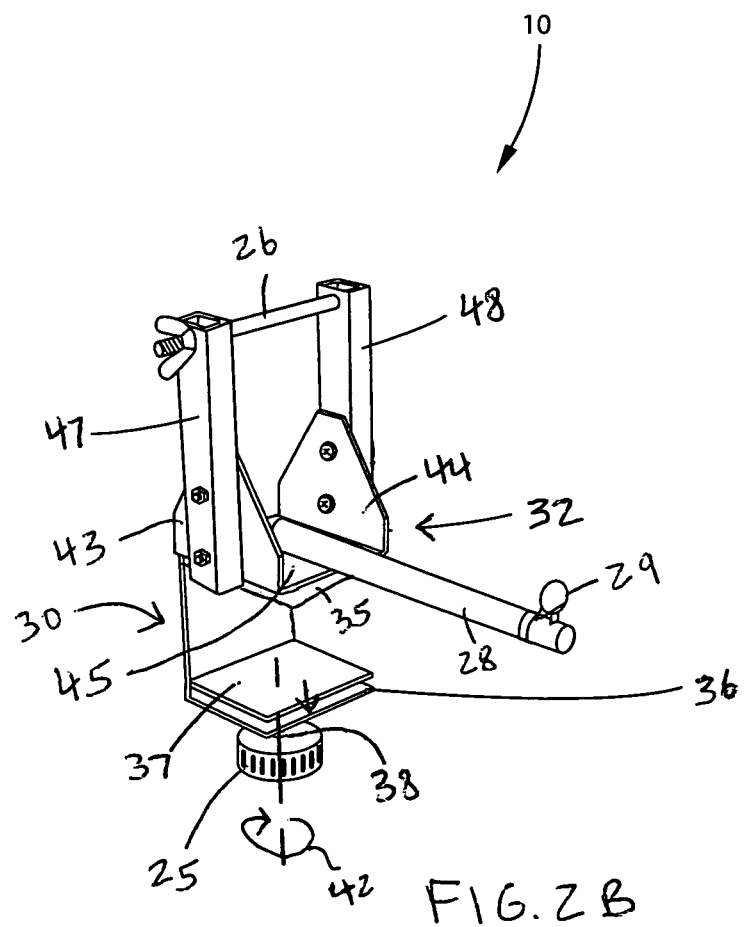
FIG. 2B is a perspective view showing a fishing line reeling apparatus wherein the knob and screw are rotated in a second rotational direction for loosening the clamp, in accordance with a non-limiting exemplary embodiment of the present disclosure.
Figure 3:
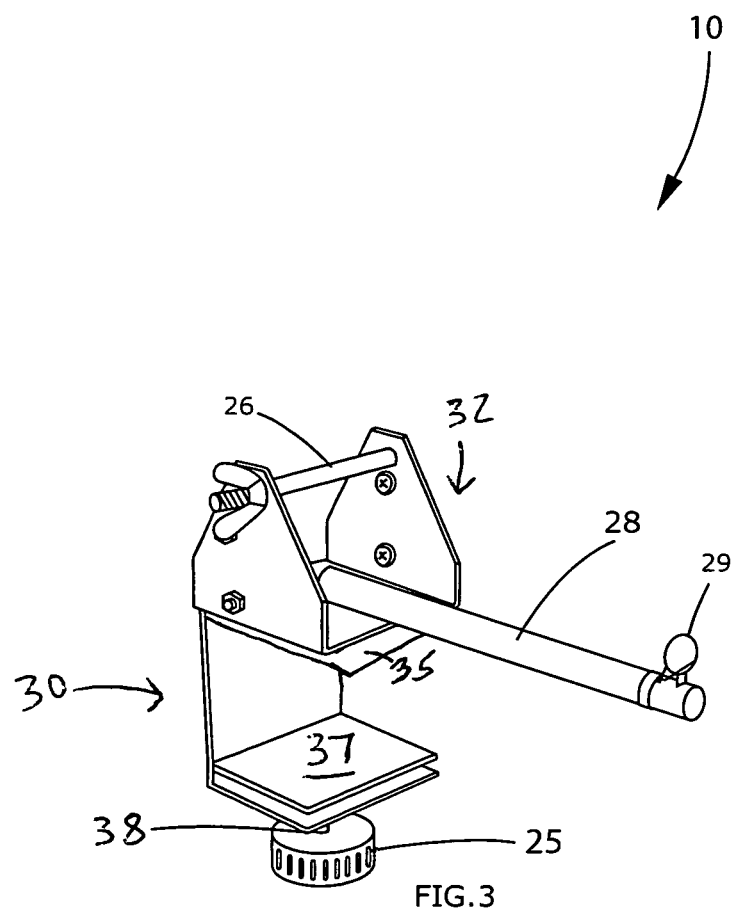
FIG. 3 is a perspective view showing the fishing line reeling apparatus of FIG. 1 without the spool of fishing line.

Referring to the FIGS. 1-3 in general, a fishing line 11 reeling apparatus 10 including a clamp 30 capable of being anchored to a ledge of an existing support surface 31, and a bracket 32 attached to the clamp 30 wherein the bracket 32 has a dowel 26 capable of rotatably receiving and suspending the existing spool 22 of fishing line 11 above the existing support surface 31. Such an arrangement allows the apparatus 10 to be clamped to a table ledge or comparable flat surface 31 to provide a sturdy anchor with which the user may line the spool 22 unassisted. The overall dimensions of the apparatus 10 may be 11" in length, 3" in width and 7" in total depth.

An arm 28 is located subjacent to the dowel 26 and statically mated to the bracket 32. The arm 28 has an eyelet 29 attached to a distal end thereof such the fishing line 11 is downwardly guided from the spool 22 and urged along a longitudinal length of the arm 28 prior to passing through the eyelet 29. The dowel 26 is suspended for use in securing a spool 22 of fishing line 11 to the apparatus 10. These support arms 47, 48 may be removable with the dowel 26 suspended to the base support member 35, thus accommodating smaller spools of fishing line. Such an arrangement helps in preventing the line 11 from inadvertently becoming twisted or tangled. As such, instead of placing their fishing spool behind the "house door" of the fishing reel, the user may thread the line spool directly.

In a non-limiting exemplary embodiment, the clamp 30 includes an upper arm 35 and a lower arm 36 spaced apart therefrom in such a manner that the upper and lower arms 35, 36 are capable of being removably attached to the ledge of the existing support surface 31. A plate 37 is intermediately positioned between the upper and lower arms 35, 36 and a tension screw 38 vertically passes through the lower arm 36 and engaging the plate 37. A knob 25 is positioned subjacent to the lower arm 36 and statically attached to the tension screw 38. In this manner, synchronous rotation of the knob 25 and the tension screw 38 in a first rotational direction 41 urges a portion of the plate 37 upwardly and away from the lower arm 36. Conversely, synchronous rotation of the knob 25 and the tension screw 38 in a second rotational direction 42 releases the portion of the plate 37 downwardly and towards the lower arm 36.

In a non-limiting exemplary embodiment, the bracket 32 includes first and second vertically oriented planar side walls 43, 44, and a horizontally oriented planar base support member 45 intermediately coupled to the first and second vertically oriented planar side walls 43, 44.

In a non-limiting exemplary embodiment, the dowel 26 is removably anchored to the first and second vertically oriented planar side walls 43, 44 and spans across an entire width of the planar base support member 45.

In a non-limiting exemplary embodiment, the bracket 32 further includes first and second vertically oriented rectilinear support arms 47, 48 removably coupled to the first and second vertically oriented planar side walls 43, 44. Notably, the dowel 26 is removably anchored to the first and second vertically oriented support arms 47, 48 and spaced above the first and second vertically oriented side walls 43, 44. In this manner, the dowel 26 spans across an entire width of the planar base support member 45.

The present disclosure further includes a method of utilizing a fishing line 11 reeling apparatus 10 for loading a spool 22 of fishing line 11 about a reel of a fishing pole. Such a method includes the steps of providing and anchoring a clamp 30 to a ledge of an existing support surface 31; providing and attaching a bracket 32 to the clamp 30 wherein the bracket 32 has a dowel 26 rotatably receiving and suspending the existing spool 22 of fishing line 11 above the existing support surface 31; providing and statically mating a dowel 26 to the bracket 32 by locating the arm 28 subjacent to the dowel 26 wherein the arm 28 has an eyelet 29 attached to a distal end thereof; and downwardly guiding a fishing line 11 from the spool 22 and urging the fishing line 11 along a longitudinal length of the arm 28 prior to passing the fishing line 11 through the eyelet 29.

Use of the reeling apparatus 10 may be very simple and straight forward. First, the user may mount the apparatus 10 to any table ledge, work bench or comparable flat surface area 31 via the clamp 30. Properly positioned in place, the clamp's upper arm 35 may rest flush over the top of the flat surface area 31, with the line guide arm 28 extending outwards. The user may then load a spool of fishing line 11 onto the apparatus 10, feeding the end of the spool 22 through the eyelet 29 so that it is flat and straight. The user may then run this end of the line 11 through eye hole fasteners of a fishing pole (not shown), securing the end of the line 11 to the pole's reel (not shown). The user may then wind the fishing reel in turn pulling the line 11 off the spool 21 through the eyelet 29 and onto the spool 21. When the spool 21 has been loaded, the end of the line 11 may be cut and the user may attach his favorite anchors and hooks to the line 11 thereby readying the fishing pole for immediate use. The apparatus 10 may then be removed from the work station and stored away in a tackle box or other easily accessed location until again needed.

There are several significant benefits and advantages associated with the reeling apparatus. As a non-limiting example, the apparatus 10 provides fishing enthusiasts with an easy and effective means of lining or relining their poles in a simple, hassle-free manner Eliminating the need to constantly wrestle with thin lines that can become easily twisted and "jump" off the reel while being wound, the apparatus 10 may facilitate a tight, instant line, keeping the assembly securely anchored in place. Boasting a guide arm 28 and support bracket 32 that are located beneath the spool 22, the apparatus 10 enables the fisherman to keep the line 11 taut and smooth as he/she lines his fishing reel (not shown). Sparing the fisherman the need to seek assistance from a fellow angler in order to line their favorite fishing rod, the apparatus 10 allows the user to complete the task with minimal effort.

Especially ideal for novice fisherman, such an apparatus 10 may further prove invaluable to older users, as well as those who may suffer from joint afflictions such as arthritis. Aspects of the apparatus' 10 design offer additional advantages. Lightweight and compact, such an apparatus 10 may easily be transported along with standard fishing gear. Moreover, the minimal components that comprise the apparatus 10 ensure that such a fishing aid may be put to use in a matter of seconds.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A fishing line reeling apparatus for loading a spool of fishing line about a reel of a fishing pole, said fishing line reeling apparatus comprising:
   a clamp capable of being anchored to a ledge of an existing support surface;
   a bracket attached to said clamp, said bracket having a dowel capable of rotatably receiving and suspending the existing spool of fishing line above the existing support surface;
   said bracket further comprising first and second vertically oriented planar side walls and a horizontally oriented planar base support member intermediately coupled to said first and second vertically oriented planar side walls;
   said bracket further comprising first and second vertically oriented rectilinear support arms removably coupled to said first and second vertically oriented planar side walls, wherein said dowel is removably anchored to said first and second vertically oriented rectilinear support arms and spaced above said first and second vertically oriented planar side walls and wherein said dowel spans across an entire width of said horizontally oriented planar base support member; and
   an arm located subjacent to said dowel and statically mated to said bracket, said arm having an eyelet attached thereto wherein the spool of fishing line is guided through said eyelet and along a longitudinal length of said arm.

2. The fishing line reeling apparatus of claim 1, wherein said clamp comprises:
   an upper arm and a lower arm spaced apart therefrom in such a manner that said upper and lower arms are capable of being removably attached to the ledge of the existing support surface;
   a plate intermediately positioned between said upper and lower arms;
   a tension screw vertically passing through said lower arm and engaging said plate; and
   a knob positioned subjacent to said lower arm and statically attached to said tension screw.

3. The fishing line reeling apparatus of claim 2, wherein synchronous rotation of said knob and said tension screw in a first rotational direction urges a portion of said plate upwardly and away from said lower arm.

4. The fishing line reeling apparatus of claim 3, wherein synchronous rotation of said knob and said tension screw in a second rotational direction releases said portion of said plate downwardly and towards said lower arm.

5. The fishing line reeling apparatus of claim 1, wherein said dowel is removably anchored to said first and second vertically oriented planar side walls and spans across an entire width of said planar base support member.

6. A fishing line reeling apparatus for loading a spool of fishing line about a reel of a fishing pole, said fishing line reeling apparatus comprising:
   a clamp capable of being anchored to a ledge of an existing support surface;
   a bracket attached to said clamp, said bracket having a dowel capable of rotatably receiving and suspending the existing spool of fishing line above the existing support surface; and an arm located subjacent to said dowel and statically mated to said bracket, said arm having an eyelet attached to a distal end thereof such the fishing line is downwardly guided from the spool and urged along a longitudinal length of said arm prior to passing through said eyelet;
   said bracket comprising first and second vertically oriented planar side walls, and a horizontally oriented planar base support member intermediately coupled to said first and second vertically oriented planar side walls;
   said bracket further comprising first and second vertically oriented rectilinear support arms removably coupled to said first and second vertically oriented planar side walls, wherein said dowel is removably anchored to said first and second vertically oriented support arms and spaced above said first and second vertically oriented planar side walls, and said dowel spans across an entire width of said horizontally oriented planar base support member.

7. The fishing line reeling apparatus of claim 6, wherein said clamp comprises:
   an upper arm and a lower arm spaced apart therefrom in such a manner that said upper and lower arms are capable of being removably attached to the ledge of the existing support surface;
   a plate intermediately positioned between said upper and lower arms;
   a tension screw vertically passing through said lower arm and engaging said plate; and
   a knob positioned subjacent to said lower arm and statically attached to said tension screw.

8. The fishing line reeling apparatus of claim 7, wherein synchronous rotation of said knob and said tension screw in a first rotational direction urges a portion of said plate upwardly and away from said lower arm.

9. The fishing line reeling apparatus of claim 8, wherein synchronous rotation of said knob and said tension screw in a second rotational direction releases said portion of said plate downwardly and towards said lower arm.

10. The fishing line reeling apparatus of claim 6, wherein said dowel is removably anchored to said first and second vertically oriented planar side walls and spans across an entire width of said planar base support member.

* * * * *